March 21, 1950     F. G. LOPEZ     2,501,397

APPARATUS FOR PREPARING MERCURY DOSING AMPOULES

Filed June 22, 1944

FRANCISCO GONZALEZ LOPEZ
INVENTOR.

BY

ATTORNEY.

Patented Mar. 21, 1950

2,501,397

UNITED STATES PATENT OFFICE 2,501,397

APPARATUS FOR PREPARING MERCURY DOSING AMPOULES

Francisco González Lopez, Buenos Aires, Argentina, assignor, by mesne assignments, to General Electric Company, Schenectady, N. Y., a corporation of New York Application June 22, 1944, Serial No. 541,514

2 Claims. (Cl. 226—19)

This invention relates to an apparatus for making evacuated and hermetically sealed glass ampules, and more particularly for preparing mercury dosing ampules utilized in the manufacture of electric discharge tubes.

In my co-pending U. S. application, Serial No. 540,770, filed June 17, 1944, now matured into Patent No. 2,415,895, issued on Feb. 18, 1947, I have explained in detail the advantages obtained in the manufacture of electric discharge tubes when evacuated and hermetically sealed glass ampules containing a small quantity of mercury are utilized for dosing the mercury filling within these tubes.

The main object of the present invention is to provide a simple and effective means for producing the dosing glass ampules shown in my application referred to above.

The above and further objects of the invention will become more apparent from the following detailed description taken with reference to the accompanying drawings forming part of the specification and wherein.

Figure 1:
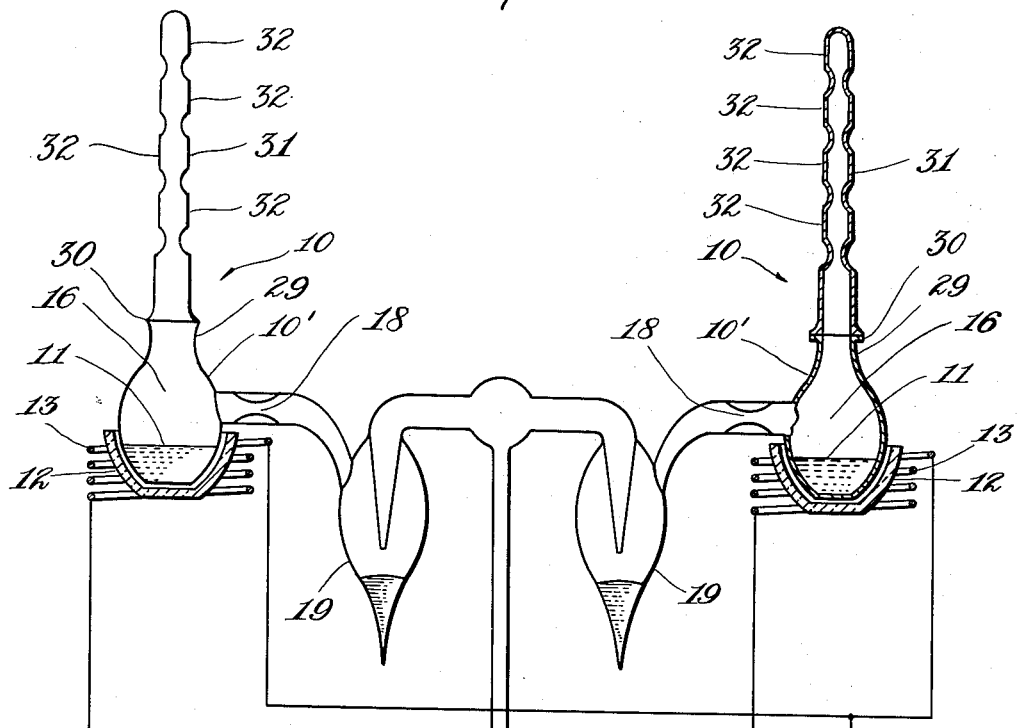
Fig. 1 illustrates a plan view of the preferred embodiment of the apparatus for preparing mercury dosing glass ampules in accordance with the present invention.

Referring now to the figures, it can be observed that the apparatus for preparing mercury dosing ampules comprises two mercury evaporators 10, each constituted of a vessel 10' the lower part of which, containing a supply of mercury 11, is provided with a jacket 12 of heat-insulating material and is located in the interior of a coil 13. Coils 13 are connected in parallel to a high-frequency generator 14 through switching means 15 which may be manually operated or which may be designed to automatically maintain the connection between high-frequency generator 14 and coils 13 during a predetermined and adjustable time interval.

The space 16 over mercury supply 11 in each vessel 10' communicates with a common exhausting system indicated generally within the broken line rectangle through individual capillaries 18 and mercury traps 19, and a common conduit 20 having inserted a stopcock 21 and connected to the inlet conduit 22 of a mercury diffusion pump 23 through another mercury trap 24.

As in the known high-vacuum pumping system, diffusion pump 23 is backed by a roughing pump 25 and is provided with a water cooling system having inlet and outlet conduits 26 and 27, respectively. The degree of vacuum is controlled with a McLeod gauge or similar device schematically indicated with rectangle 28.

The upper part of vessels 10' has a neck 29 terminating in a thickened rim 30 to each of which the open ends of glass tubings 31 are sealed. Before being sealed to rims 30 of vessels 10', glass tubings 31 are closed at one end and their diameter is shrunk or constricted at substantially equal intervals so that the glass tubing is subdivided in a plurality of serially intercommunicating containers 32 which are transformed into mercury dosing ampules as will be explained hereinbelow.

After glass tubings 31 have been sealed to rims 30, stopcock 21 is turned to a position in which the interior of evaporators 10 and glass tubings 31 is connected to the exhausting system 17. Mercury pools or supplies 11 are maintained at substantially room temperature and the exhaustion of glass tubings 31 is carried out until a pressure of approximately $5.10^{-5}$ mm. of Hg is obtained. Stopcock 21 is then turned to its closed position to temporarily seal off mercury evaporators 10 and glass tubings 31.

Figure 2:
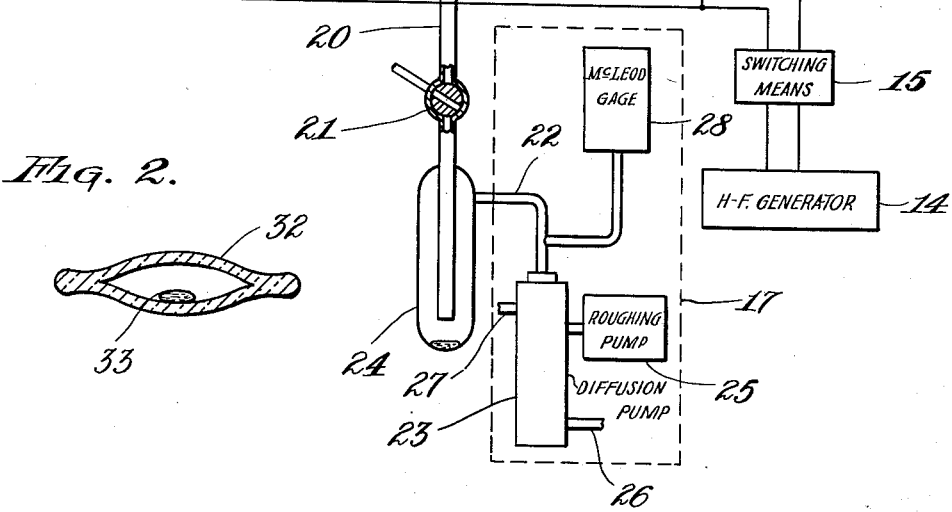
Fig. 2 is an enlarged view of a longitudinal cross section of a finished dosing glass ampule.

Switching means are now operated to connect the output of high-frequency generator 14 to coils 13 during a predetermined time interval and mercury 11 within vessels 10' is heated by induction to evaporation temperature. The evaporated mercury penetrates into glass tubing 31 and is condensed on the interior surfaces of containers 32. Experience has shown that the condensed mercury is evenly distributed throughout the extension of glass tubings 31, so that by sealing off the shrunk portions of glass tubings 31, containers 32 are transformed into dosing ampules each including a mercury drop 33, as shown in Fig. 2. Usually, glass tubings 31 will be first sealed off in the vicinity of rims 30, so that new glass tubings can be sealed to evaporators 10 and the preparation of a new series of dosing ampules can be started, while the hermetically sealed glass tubings 31 are transformed into hermetically sealed dosing ampules, as explained hereinabove.

Although I have shown the apparatus for making dosing ampules as including two evaporators only, it will be understood by those skilled in the art that a plurality of similar evaporators, radially distributed with respect to common conduit 20, can be used in order to increase the rate of production of the dosing ampules. It will also be understood that many modifications may be introduced in the particular organization shown and described without departing from the scope of my invention, as set forth in the appended claims.

I claim:

1. An apparatus for preparing mercury dosing ampules for electric discharge tubes, comprising at least one substantially perpendicularly disposed glass tubing closed at its upper end and having the diameter thereof shrunk at substantially equal intervals to form a plurality of serially intercommunicating containers, means to hermetically seal the open lower end of said glass tubing to a vessel including a mercury supply, means to communicate said vessel and glass tubing with exhausting means, means to temporarily seal off said vessel and said glass tubing after a predetermined degree of vacuum within said glass tubing has been obtained, means to inductively heat the mercury supply to fill said glass tubing with mercury vapour, and means to seal off said containers one by one after the mercury vapour has condensed in said glass tubing to produce evacuated and hermetically sealed dosing ampules containing substantially like quantities of mercury.

2. An apparatus for preparing mercury dosing ampules for electric discharge tubes, comprising a plurality of vessels each containing a mercury supply and located within a high-frequency heating coil, a plurality of substantially perpendicularly disposed glass tubings closed at their upper ends and having the diameters thereof shrunk at substantially equal intervals to form serially intercommunicating containers, means to seal the open lower ends of said glass tubings to said vessels, means to communicate said vessels and glass tubings with a common exhausting means, means to temporarily seal off said vessels and the glass tubings sealed thereto after a predetermined degree of vacuum has been obtained, means to connect said heating coils to a common high-frequency generating means to inductively heat the mercury in said vessels and to fill the glass tubings with mercury vapour, and means to seal off said containers one by one after the mercury vapour has condensed in said glass tubings to produce evacuated and hermetically sealed dosing ampules containing substantially equal quantities of mercury.

FRANCISCO GONZÁLEZ LOPEZ.

REFERENCES CITED

The following references are of record in the file of this patent:

UNITED STATES PATENTS

| Number | Name | Date |
| --- | --- | --- |
| 1,877,726 | Noble | Sept. 13, 1932 |